(No Model.)

S. TOFFLER.
BASKET.

No. 333,793. Patented Jan. 5, 1886.

WITNESSES:
Jos. N. Rosenbaum.
Ernst Wolff.

INVENTOR
Simon Toffler
BY
Goepel & Raegener
ATTORNEYS.

UNITED STATES PATENT OFFICE.

SIMON TOFFLER, OF NEW YORK, N. Y.

BASKET.

SPECIFICATION forming part of Letters Patent No. 333,793, dated January 5, 1886.

Application filed February 2, 1885. Serial No. 154,597. (No model.)

*To all whom it may concern:*

Be it known that I, SIMON TOFFLER, of the city, county, and State of New York, have invented certain new and useful Improvements in Baskets, of which the following is a specification.

This invention has reference to an improved basket to be used for conveying goods in stores, and for domestic and other purposes.

Figure 1:
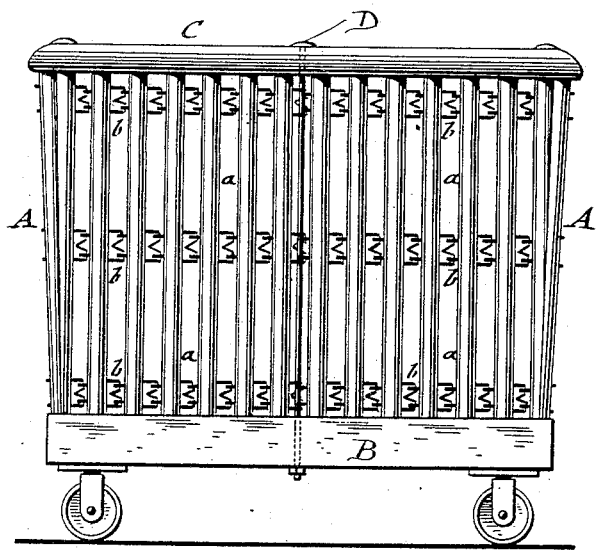
Figure 2:
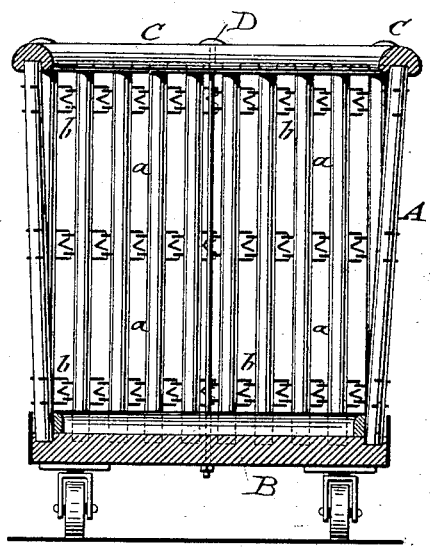

In the accompanying drawings, Figure 1 represents a side elevation of a basket to be used in stores for conveying purposes. Fig. 2 is a vertical transverse section of the same on line $x$ $x$, Fig. 1.

Similar letters of reference indicate corresponding parts.

A in the drawings represents a basket, the body and side walls of which are formed of slats or staves $a$ $a$, of round or other cross-section, which are connected at two or more points by transverse wire rods, links, or chains $b$ $b$, in the manner shown in my patent of the United States, No. 295,839, or in any other suitable manner. The lower ends of the wooden slats $a$ $a$ rest in socket-holes in the bottom B, which may be placed on rollers, as shown in Fig. 1, so as to facilitate the moving of the same. The upper ends of the slats rest in grooves in a hand-rail, C, made of wood, rubber, or other suitable material, as shown. The hand-rail C and bottom B are connected at suitable intervals by vertical bolt-rods D, which hold them together. This form of basket is specially adapted for conveying goods in stores.

The advantages of my improved basket over the willow or rattan baskets are, that they are stronger and more durable; that they can be shipped in knockdown state and readily put up for use; that by the openings between the slats the articles in the basket are well ventilated and any moisture in the same evaporated; that the slats are not liable to form splinters, so as to tear the contents, and that they will be always clean and free of dust, as the latter has no chance of settling in any part of the basket.

Having thus described my invention, I claim as new and desire to secure by Letters Patent—

The combination, in a basket, of a bottom provided with socket-holes, a grooved hand-rail, a series of wooden slats having their lower ends resting in said socket-holes and their upper ends in said grooved hand-rail, metallic chains interlaced with said slats transversely thereof, bolt-rods extending vertically between said hand-rail and bottom, and nuts on said bolt-rods for tightly clamping and re-enforcing the body of the basket, substantially as described.

In testimony that I claim the foregoing as my invention I have signed my name in presence of two subscribing witnesses.

SIMON TOFFLER.

Witnesses:
PAUL GOEPEL,
CARL KARP.